United States Patent
Sawamura et al.

[19]

[11] Patent Number: 5,827,151
[45] Date of Patent: Oct. 27, 1998

[54] CONTROL SYSTEM FOR INTERNAL COMBUSTION ENGINES FOR VEHICLES

[75] Inventors: Kazutomo Sawamura; Akira Kato; Yoshiharu Saito; Kenichiro Ishii, all of Wako, Japan

[73] Assignee: Honda Giken Kogyo Kabushiki Kaisha, Tokyo, Japan

[21] Appl. No.: 845,397

[22] Filed: Apr. 24, 1997

[30] Foreign Application Priority Data

Apr. 26, 1996 [JP] Japan .................................. 8-131406

[51] Int. Cl.⁶ .................................................. F02D 41/04
[52] U.S. Cl. .......................................................... 477/109
[58] Field of Search ................................ 477/102, 109

[56] References Cited

U.S. PATENT DOCUMENTS

| | | | |
|---|---|---|---|
| 5,079,970 | 1/1992 | Butts et al. | 477/109 |
| 5,445,576 | 8/1995 | Motamedi et al. | 477/109 |
| 5,580,331 | 12/1996 | Shiraishi et al. | 477/109 |

FOREIGN PATENT DOCUMENTS

5-321707  12/1993  Japan .

*Primary Examiner*—Dirk Wright
*Attorney, Agent, or Firm*—Armstrong, Westerman, Hattori, McLeland & Naughton

[57] ABSTRACT

A control system for an internal combustion engine for a vehicle has an automatic transmission. The control system is operable during gear shifting of the automatic transmission, for changing output torque of the engine to reduce a shock generated during the gear shifting. During gear shifting in which a change gear ratio of the automatic transmission is to be increased, upon stepping-on of the accelerator pedal of the vehicle, the output torque of the engine is increased by a first predetermined amount based on an operating condition of the vehicle when an increase occurs in the rotational speed of the engine due to the gear shifting. After the output torque of the engine is increased by the first predetermined amount, the output torque of the engine is decreased by a second predetermined amount based on the operating condition of the vehicle. After the output torque of the engine is decreased by the second predetermined amount, the output torque of the engine is progressively recovered to a value assumed upon completion of the gear shifting.

9 Claims, 7 Drawing Sheets

CONTROL SYSTEM FOR INTERNAL COMBUSTION ENGINES FOR VEHICLES

BACKGROUND OF THE INVENTION

1. Field of the Invention

This invention relates to a control system for internal combustion engines for vehicles, which is capable of reducing a shock generated during gear shifting upon stepping-on of an accelerator pedal of the vehicle.

2. Prior Art

Conventionally, to reduce a shock generated during gear shifting of an automotive transmission of an automotive vehicle, a throttle valve control system for internal combustion engines for vehicles has been proposed, for example, from Japanese Laid-Open Patent Publication No. 5–321707. According to the proposed throttle valve control system, when an upshift is carried out, i.e. when the change gear ratio (reduction gear ratio) of the automatic transmission is reduced, a throttle actuator of the engine coupled to a throttle valve is controlled to regulate the throttle valve opening such that the output torque of the engine is once increased and then decreased below a value before the upshift. As a result, a decrease in the deceleration to decelerate the vehicle and a subsequent increase in the acceleration to accelerate the vehicle can be suppressed, to thereby reduce a shock generated by the upshift.

In the conventional throttle valve control system, however, there is no mention of reduction of a shock generated during a downshift upon stepping-on of an accelerator pedal of the vehicle. When a downshift is effected upon stepping-on of accelerator pedal, the throttle valve is opened to increase the output torque of the engine, and gear shifting to a lower speed position takes place to increase the change gear ratio, which unfavorably causes large fluctuations in the driving force before and after the downshift, which are sensed by the driver as an unexpected difference in the driving force to thereby degrade the drivability.

More specifically, for example, explanation will be made of the case where a downshift is carried out from a fourth-speed position to a second-speed position. FIGS. 1A to 1D collectively show a timing chart of transient characteristics exhibited by a conventional internal combustion engine and a transmission thereof during a downshift, including hydraulic pressure for operating clutches of the automatic transmission, the engaging forces of the clutches, the rotational speed of the engine, and the output torque from the engine. The engaging force of the clutch is determined by the magnitude of torque applied to the clutch. When the downshift is started, the fourth-speed clutch pressure P4 is decreased, and when the fourth-speed clutch engaging force T4c becomes lower than the input torque Tr (main shaft-side torque), the transmission enters the inertia phase at a time point a. When the second-speed clutch pressure P2 is increased with the decrease in the fourth-speed clutch pressure P4, the direction of transmission of the torque from the second-speed clutch is opposite to that of the torque from the fourth-speed clutch, and accordingly the output torque Tco of the engine largely decreases at a time period b. When the rotation of the second-speed gear becomes synchronized with the rotation of the main shaft of the automatic transmission, the inertia phase is terminated at a time point c, and the transmission enters the torque phase in which the input torque is divided into the second-speed clutch and the fourth-speed clutch, at a time period d. At this time, the output torque Tco sharply increases. Thereafter, when the fourth-speed clutch pressure P4 is further decreased so that the fourth-speed clutch engaging force T4c becomes equal to 0 at a time point e, the downshift is completed. Thus, according to the prior art, the driving force drops during the inertia phase and then sharply increases during the torque phase, i.e. the driving force largely fluctuates before and after the downshift.

SUMMARY OF THE INVENTION

It is the object of the invention to provide a control system for internal combustion engines for vehicles, which is capable of reducing a shock generated during a downshift of the automatic transmission upon stepping-on of the accelerator pedal.

To attain the above object, the present invention provides a control system for an internal combustion engine for a vehicle having an accelerator pedal, the engine having an automatic transmission, the control system being operable during gear shifting of the automatic transmission, for changing output torque of the engine to reduce a shock generated during the gear shifting, comprising:

engine output torque-increasing means operable during gear shifting of the automatic transmission upon stepping-on of the accelerator pedal in which a change gear ratio of the automatic transmission is to be increased, for increasing the output torque of the engine by a first predetermined amount based on an operating condition of the vehicle when an increase occurs in rotational speed of the engine due to the gear shifting;

engine output torque-decreasing means operable after the output torque of the engine is increased by the first predetermined amount, for decreasing the output torque of the engine by a second predetermined amount based on the operating condition of the vehicle; and engine output torque-recovering means operable after the output torque of the engine is decreased by the second predetermined amount, for progressively recovering the output torque of the engine to a value assumed upon completion of the gear shifting.

Preferably, the control system includes throttle valve control means for controlling valve opening of a throttle valve arranged in the intake system of the engine, and for changing the output torque of the engine by controlling the valve opening of the throttle valve via the throttle valve control means.

Alternatively, the control system changes the output torque of the engine by controlling ignition timing of the engine.

Advantageously, the first predetermined amount is set to a larger value as traveling speed of the vehicle is higher.

Preferably, the engine output torque-increasing means terminates operation thereof when a ratio of rotational speed between an input side and an output side of the automatic transmission drops below a predetermined value.

Advantageously, the engine output torque-decreasing means has an operating time period thereof set to a larger value as traveling speed of the vehicle is higher.

Also advantageously, the second predetermined amount is set to a larger value as traveling speed of the vehicle is higher.

Preferably, the engine output torque-recovering means progressively recovers the output torque of the engine to the value assumed upon completion of the gear shifting by adding a third predetermined amount based on the operating condition of the vehicle to a value of the output torque of the engine decreased by the second predetermined amount.

Advantageously, the third predetermined amount is set to a larger value as traveling speed of the vehicle is higher.

The above and other objects, features and advantages of the invention will become more apparent from the following detailed description taken in conjunction with the accompanying drawings.

BRIEF DESCRIPTION OF THE DRAWINGS

FIGS. 1A to 1D collectively form a timing chart showing transient characteristics exhibited by a conventional internal combustion engine and a transmission thereof according to the prior art, in which:

FIG. 7A to 7G collectively form a timing chart showing transient characteristics exhibited by the engine and the control system according to the embodiment during a downshift, in which:

DETAILED DESCRIPTION

The invention will now be described in detail with reference to the drawings showing an embodiment thereof.

Figure 1A:
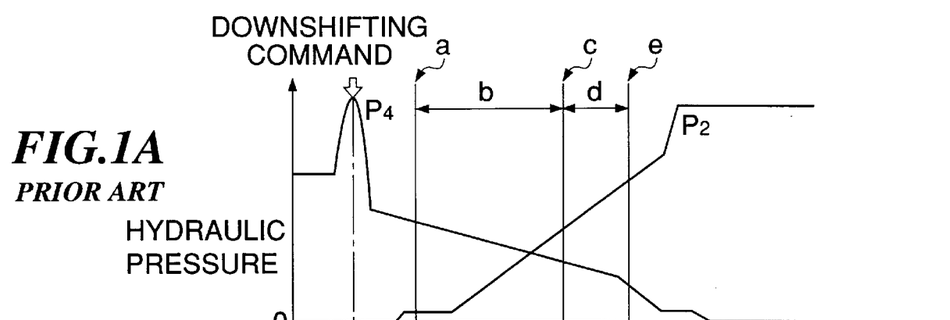
FIG. 1A shows changes in hydraulic pressure for operating clutches.
Figure 1B:
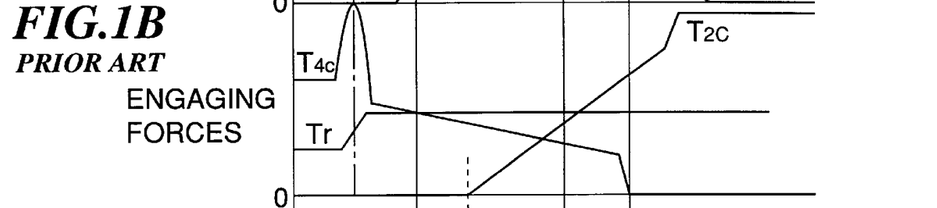
FIG. 1B shows changes in the engaging forces of the clutches.
Figure 1C:
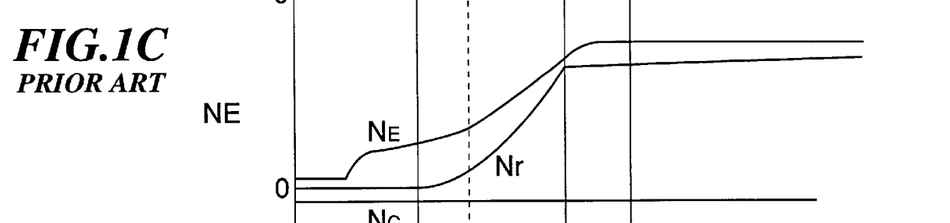
FIG. 1C shows a change in the rotational speed of the engine.
Figure 1D:
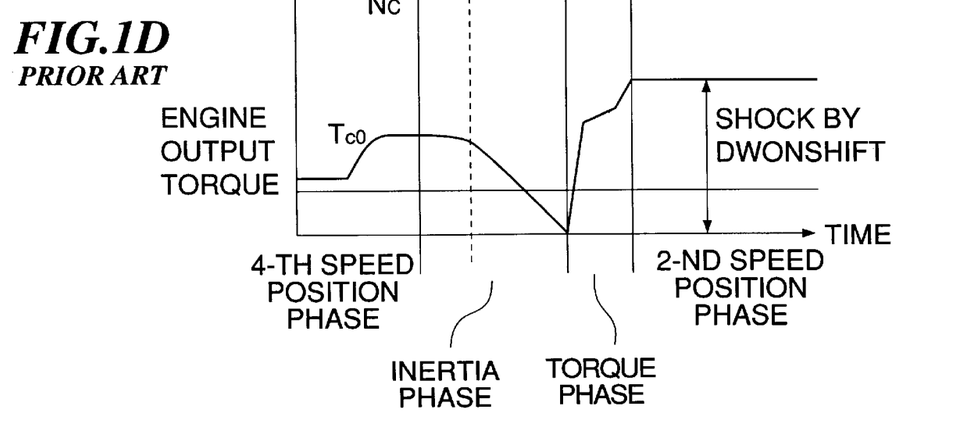
FIG. 1D shows a change in the output torque Tco of the engine.
Figure 2:
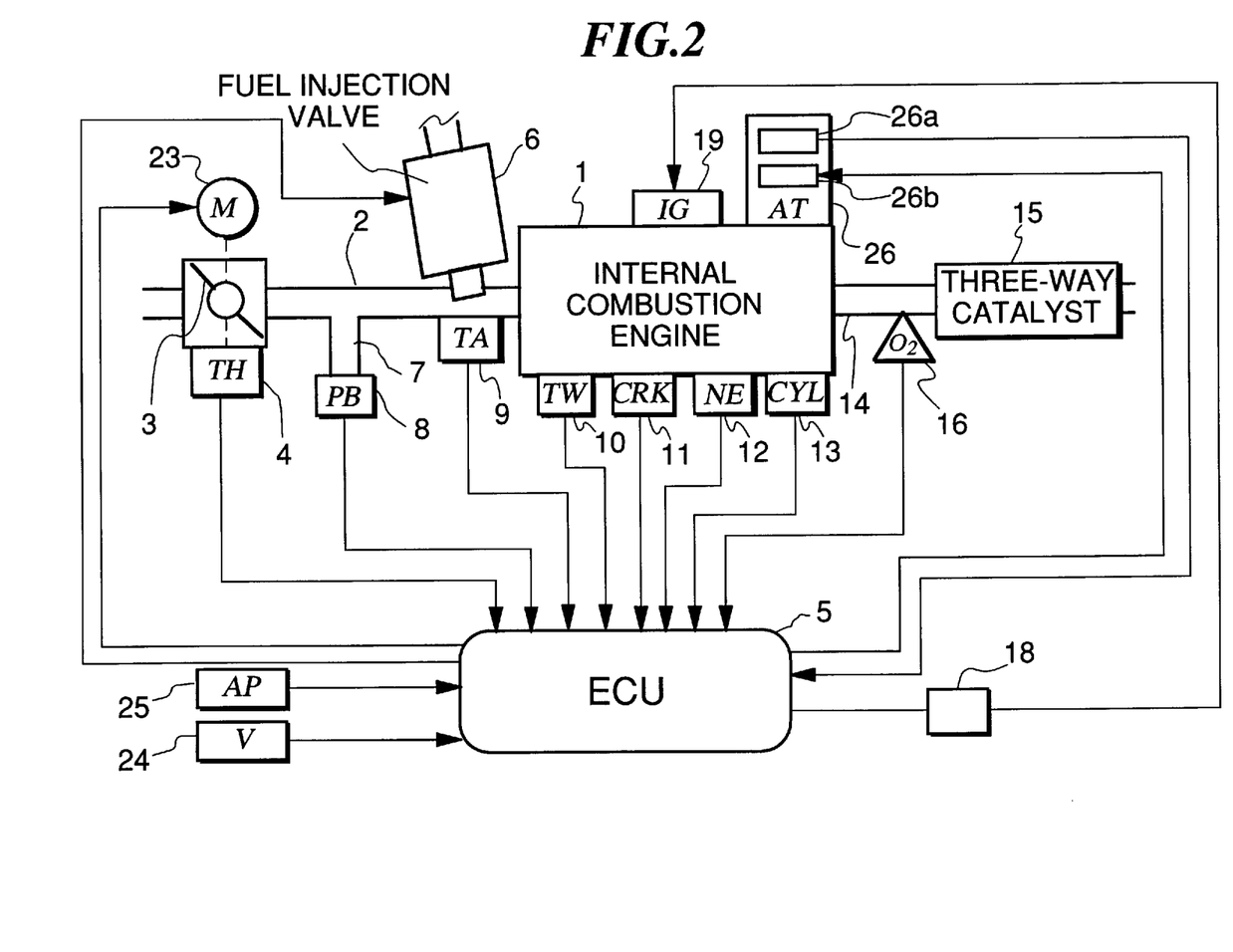
FIG. 2 is a block diagram schematically showing the whole arrangement of an internal combustion engine and a control system therefor, according to an embodiment of the invention.

Referring first to FIG. 2, there is illustrated the whole arrangement of an internal combustion engine (hereinafter simply referred to as "the engine") and a control system therefor, according to an embodiment of the invention.

In the figure, reference numeral 1 designates an internal combustion engine, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator pedal position (AP) sensor 25 electrically connected to the ECU 5, for detecting the position AP of an accelerator pedal of the vehicle, not shown. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating sensor (hereinafter referred to as "the CYL sensor") 13, an engine rotational speed (NE) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The NE sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18. Further connected to the ECU 5 is an automatic transmission 26 which is a conventional type and provided with a hydraulic pressure control circuit 26b for controlling the operations of a lock-up clutch and a gear mechanism of the transmission, neither of which is shown, and a gear position sensor 26a for detecting the shift position of the gear mechanism. The hydraulic pressure control circuit 26b and the gear position sensor 26a are electrically connected to the ECU 5. The hydraulic pressure control circuit 26b drives gear-shifting linear solenoid valves, not shown, of the gear mechanism for controlling hydraulic pressure for operating clutches of the transmission.

A three-way catalyst (catalytic converter) 15 is arranged in an exhaust pipe 14 of the engine 1, for purifying noxious components in exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalytic converter 15, which detects the concentration of oxygen present in exhaust gases and supplies an electric signal indicative of the sensed oxygen concentration to the ECU 5. Further electrically connected to the ECU 5 is a vehicle speed sensor 24 for detecting the traveling speed (vehicle speed) of a vehicle in which the engine 1 is installed and supplying a signal indicative of the sensed vehicle speed V to the ECU 5.

The ECU 5 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU"), memory means storing various operational programs which are executed by the CPU, and for storing results of calculations therefrom, etc., and an output circuit which supplies driving signals to the fuel injection valves 6, the distributor 18, the throttle actuator 23, etc., and also supplies control signals to the hydraulic control circuit 26.

The CPU of the ECU 5 operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases detected by the O2 sensor 16, and air-fuel ratio open-loop control regions, and calculates, based upon the determined engine operating conditions, a fuel injection time period Tout for each of the fuel injection valves 6, in synchronism with generation of TDC signal pulses, by the use of the following equation (1):

$$\text{Tout} = Ti \times KO2 \times K1 + K2 \qquad (1)$$

where Ti represents a basic value of the fuel injection period Tout, which is determined according to the engine rotational speed NE and the intake pipe absolute pressure PBA, by the use of a Ti map, not shown, and stored in the memory means.

KO2 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability.

Further, the CPU of the ECU 5 calculates the ignition timing θ IG of the engine, based on the determined engine operating conditions. Driving signals corresponding to the TOUT and θ IG values calculated as above are delivered via the output circuit to the fuel injection valves 6 and the spark plugs 19, respectively, to drive them.

Further, the CPU controls the engaged state of the lock-up clutch, the shift position of the gear mechanism, the valve opening TH of the throttle valve 3 in response to outputs signals from various engine operating parameter sensors.

Figure 3:
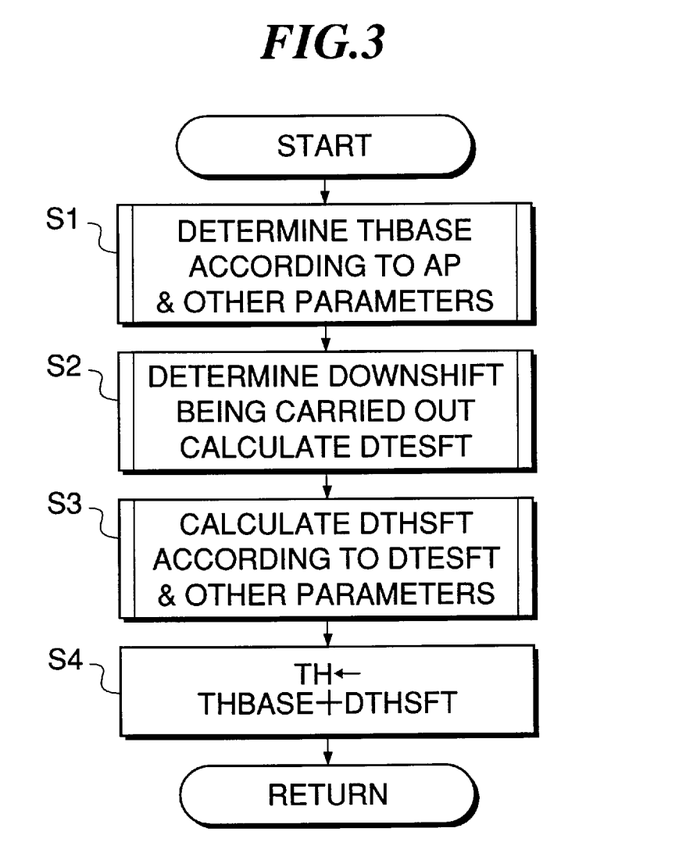
FIG. 3 is a flowchart showing main routine for controlling the output torque of the engine, which is executed by an ECU appearing in FIG. 2.
Figure 4:
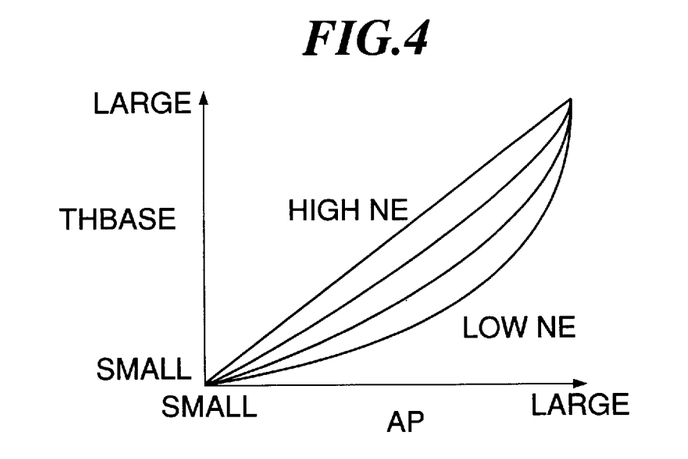
FIG. 4 is a graph showing the relationship between a basic value THBASE of the throttle valve opening TH, an accelerator pedal position AP, and engine rotational speed NE.

FIG. 3 shows a main routine for carrying out engine output torque control processing, which is executed by the ECU 5. This processing is repeatedly executed at predetermined time intervals set by a timer. First, at a step S1, a basic value THBASE of the throttle valve opening TH is determined according to the accelerator pedal position AP and the engine rotational speed NE. FIG. 4 is a graph showing the relationship between the basic throttle valve opening THBASE, the accelerator pedal position AP, and the engine rotational speed NE.

Then, it is determined at a step S2 whether or not a downshift of the automatic transmission 26 is being carried out due to stepping-on of the accelerator pedal, from outputs from the accelerator pedal position sensor 25 and the gear position sensor 26a. Then, a torque correction amount DTESFT for reducing a shock caused by a downshift is calculated depending on the result of the determination. When a downshift is being carried out due to stepping-on of the accelerator pedal, the torque correction amount DTESFT is calculated in response to gear-shifting conditions which change every moment according to the speed position SFT, the output torque of the engine (engine rotational speed NE and intake pipe absolute pressure PBA), the change gear ratio of the transmission, the vehicle speed V, etc. Processing for calculating the torque correction amount DTESFT will be described hereinafter.

When a downshifting command is issued and delivered to the hydraulic pressure control circuit 26 from the CPU of the ECU 5, based on the outputs from the accelerator pedal position sensor 25 and the gear position sensor 26a, gear-shifting linear solenoid valves of the gear mechanism are driven based on gear-shifting conditions (third-speed position →second-speed position, fourth-speed position →second-speed position, etc.). However, a delay time exists between the time the linear solenoid valve for the clutch of the target speed position starts to be driven and the time the operating hydraulic pressure actually rises, and therefore execution of the torque correction amount DTESFT-calculation is delayed by a predetermined delay time period. The torque correction amount DTESFT is kept at 0 until the start of the calculation. When the predetermined delay time period has elapsed and a target speed position clutch starts to be engaged, the torque correction amount DTESFT-calculation is executed. The torque correction amount DTESFT calculated in this processing is basically set to a positive value at the start of a downshift which increases the change gear ratio of the automatic transmission 26, so as to increase the engine output torque. On the other hand, when the downshift is completed, the value DTESFT is set to a negative value so as to decrease the engine output torque and then progressively returned to 0, to thereby reduce a shock caused by the downshift. When the torque correction amount DTESFT is equal to 0, the throttle valve opening TH is not substantially changed. When the torque correction amount DTESFT is larger than 0, an increase in the engine output torque is demanded, while when the torque correction amount DTESFT is smaller than 0, a decrease in the engine output torque is demanded.

Figure 5:
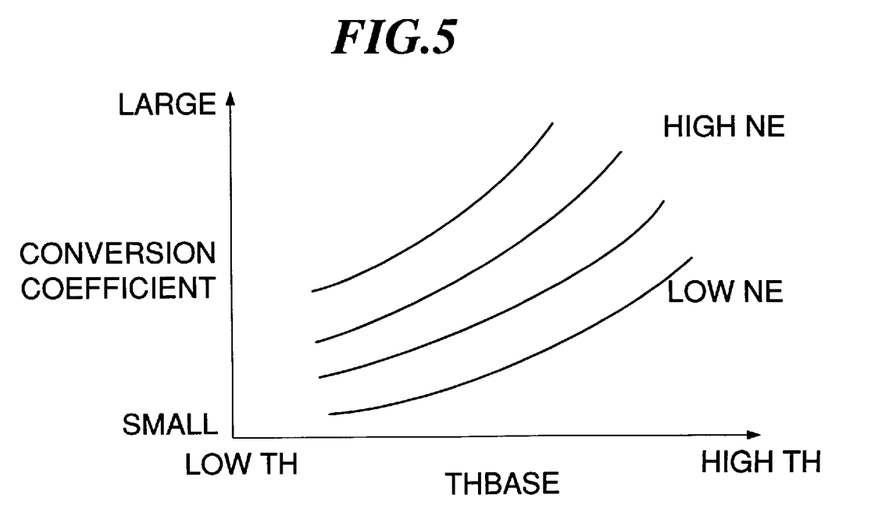
FIG. 5 is a graph showing the relationship between a conversion coefficient, the engine rotational speed NE, and the basic throttle valve opening THBASE.

At a step S3, a throttle valve opening correction amount DTHSFT is calculated based on the torque correction amount DTESFT calculated at the step S2. More specifically, the throttle valve opening correction amount DTHSFT is obtained by multiplying the torque correction amount DTESFT by a conversion coefficient which is retrieved from a map according to the engine rotational speed NE and the basic throttle valve opening THBASE. FIG. 5 shows the map for determining the conversion coefficient. The conversion coefficient is set to a larger value as the engine rotational speed NE becomes higher and/or the basic throttle valve opening THBASE becomes larger.

Then, throttle valve control is carried out at a step S4. More specifically, the throttle valve opening TH is set to a value obtained by adding the throttle valve opening correction amount DTHSFT to the basic throttle valve opening THBASE, followed by terminating the present routine. Thus, the throttle valve 3 is driven to the set throttle valve opening TH through the throttle actuator 23.

Figure 6:
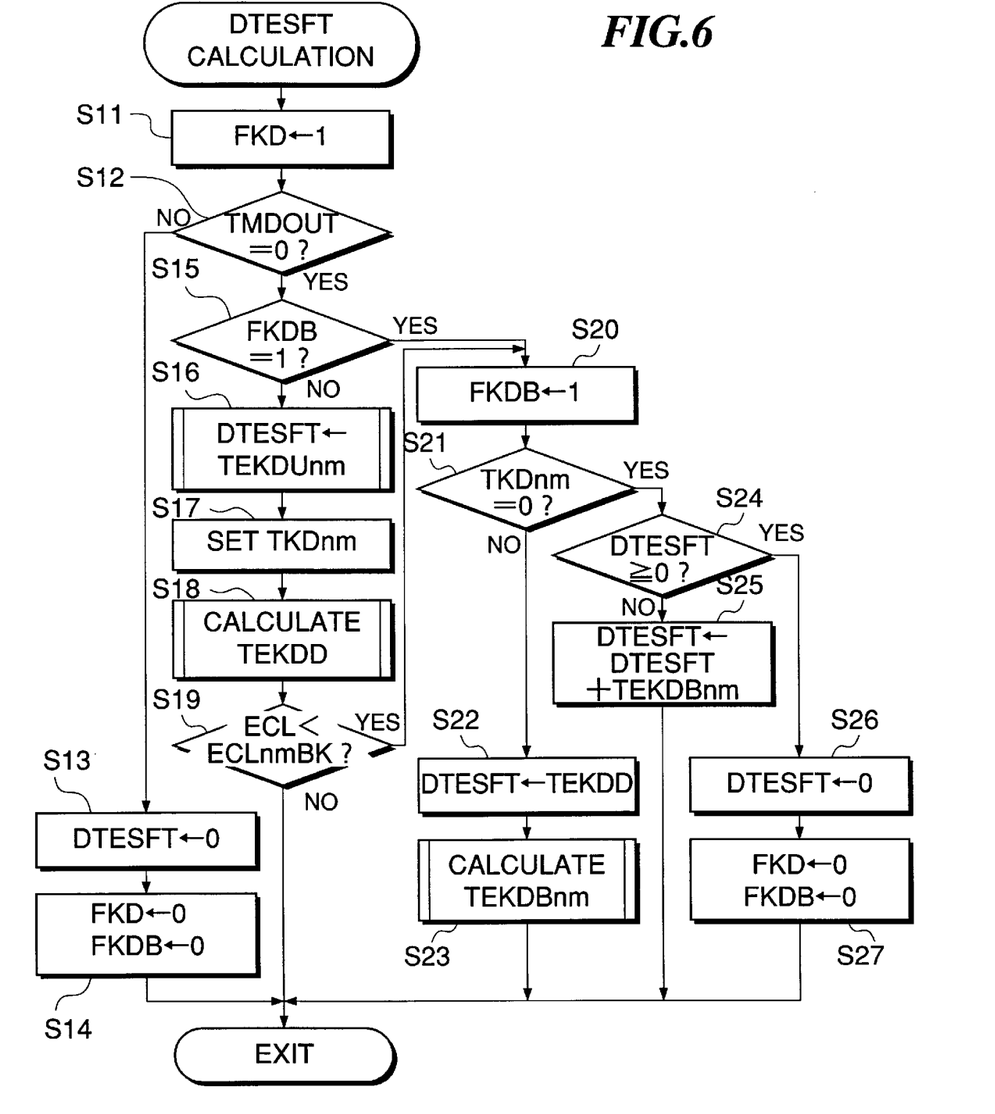
FIG. 6 is a flowchart showing a subroutine for calculating a torque correction amount DTESFT employed during a downshift, which is executed at a step S2 in FIG. 3.
Figure 7A:
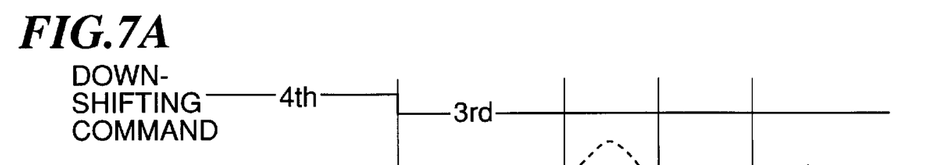
FIG. 7A shows a gear-shifting command signal.
Figure 7B:
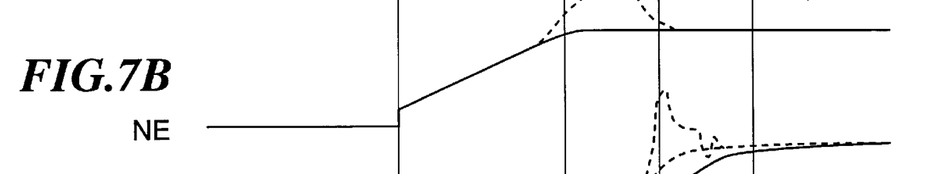
FIG. 7B shows a change in the engine rotational speed NE.
Figure 7C:
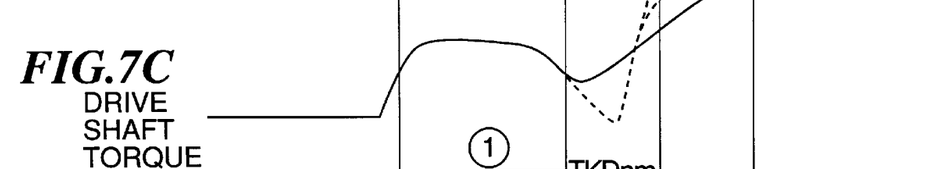
FIG. 7C shows a change in the torque of a drive shaft of the vehicle.
Figure 7D:
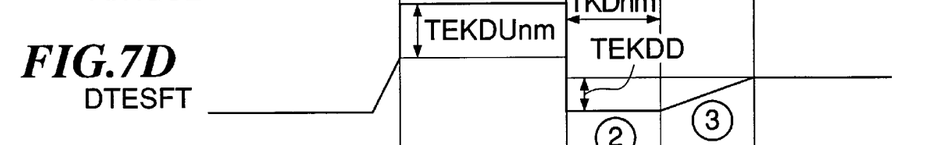
FIG. 7D shows a change in the torque correction amount DTESFT.
Figure 7E:
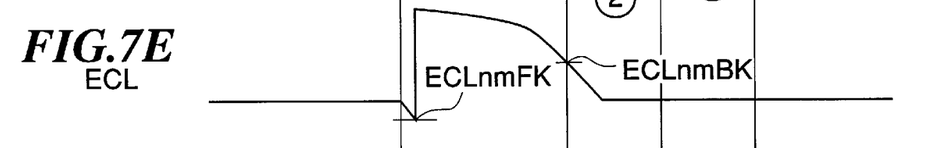
FIG. 7E shows a change in an input/output rotational speed ratio ECL.
Figure 7F:
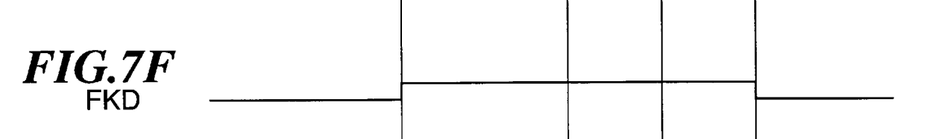
FIG. 7F shows a change in a flag FKD.
Figure 7G:
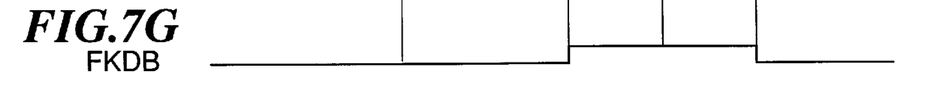
FIG. 7G shows a change in a flag FKDB.

FIG. 6 shows a subroutine for carrying out the torque correction amount DTESFT-calculating processing during a downshift, which is executed at the step S2 in FIG. 3. FIGS. 7A to 7I collectively show the relationship in timing between the torque of a drive shaft of the vehicle, the torque correction amount DTESFT, and an input/output rotational speed ratio ECL, which are assumed during a downshift (fourth-speed position → third-speed position). The input/output rotational speed ratio ECL is a ratio of the rotational speed of a wheel-side shaft (counter shaft) of the automatic transmission 26 to the rotational speed of an engine-side shaft (main shaft) of the same.

First, at a step S11 in FIG. 6, a flag FKD is set to "1", to indicate that a downshift upon stepping-on of the accelerator pedal is being carried out. Then, it is determined at a step S12 whether or not the value of a down-counting timer TMDOUT is equal to 0. The down-counting timer TMDOUT counts a time period from the time the linear solenoid valve starts to be driven in response to the downshifting command to the time the hydraulic pressure rises. If the value of the timer TMDOUT is not equal to 0, the torque correction amount DTESFT is set to 0 at a step S13, and the flag FKD and a flag FKDB, referred to hereinbelow, are reset to 0 at a step S14, followed by terminating the present routine.

Figure 8:
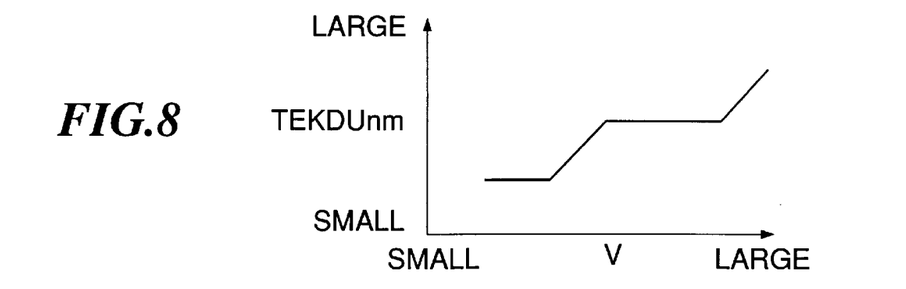
FIG. 8 shows a table for determining a torque increment TEKDUnm according to the vehicle speed V.

On the other hand, if it is determined at the step S12 that the down-counting timer TMDOUT has become equal to 0, it is determined at a step S15 whether or not the flag FKDB is set to 1. The flag FKDB indicates, when set to "1", that the input/output rotational speed ratio ECL is smaller than a predetermined value ECLnmBK, referred to hereinafter. If the flag FKDB is reset to "0", the torque correction amount DTESFT is set to a torque increment TEKDUnm at a step S16. This setting is for increasing the engine output torque to suppress a drop in the driving force in a so-called inertia phase, indicated by a state 1 in ~FIG. 7D, in which a clutch of the target speed position (third-speed position) starts to be engaged so that the engine rotational speed NE rises. FIG. 8 shows a table for determining the torque increment TEKDUnm according to the vehicle speed V. As shown in FIG. 8, the torque increment TEKDUnm is set to a larger value as the vehicle speed V becomes larger. There are provided six different patterns of this table depending on the gear-shifting conditions (fourth-speed position →third-speed position, fourth-speed position →second-speed position, fourth-speed position →first-speed position, third-speed position →second-speed position, third-speed position →first-speed position, and second-speed position →first-speed position).

Figure 9:
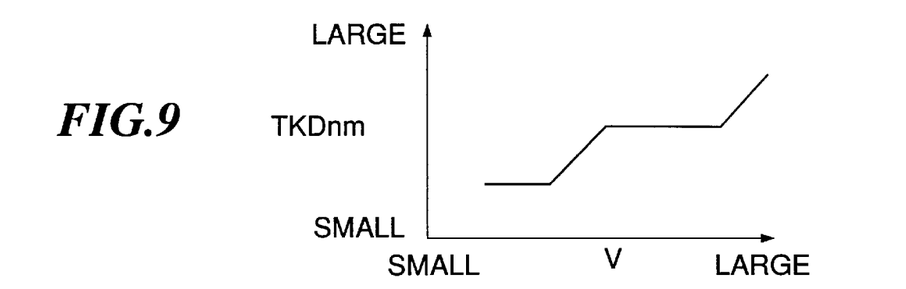
FIG. 9 shows a table for determining the value of a down-counting timer TKDnm according to the vehicle speed V.

Then, at a step S17, a down-counting timer TKDnm is set to a predetermined value and started. The down-counting timer TKDnm counts a time period over which a torque decrement TEKDD, referred to hereinbelow, is to be applied. FIG. 9 shows a table for determining the value of the down-counting timer TKDnm according to the vehicle speed V. The value of the down-counting timer TKDnm is set to a larger value as the vehicle speed V becomes larger. There are provided six different patterns of this table depending on the gear-shifting conditions, similarly to the torque increment TEKDUnm.

Next, the torque decrement TEKDD is calculated at a step S18, by the use of the following equation (2):

$$TEKDD = \text{(change gear ratio before downshift/change gear ratio after downshift} - 1) \times DTESFT \times KKD \quad (2)$$

where KKD represents a correction coefficient.

Figure 10:
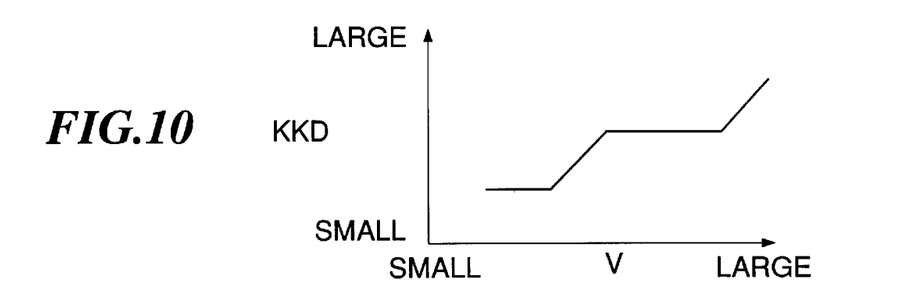
FIG. 10 shows a table for determining a correction amount KKD according to the vehicle speed V.

FIG. 10 shows a table for determining the correction coefficient KKD according to the vehicle speed V. The correction coefficient KKD is set to a larger value as the vehicle speed V becomes larger. There are provided six different patterns of this table depending on the gear-shifting conditions, similarly to the torque increment TEKDUnm.

Then, it is determined at a step S19 whether or not the input/output rotational speed ratio ECL has become smaller than the predetermined value ECLnmBK, which indicates that the rotation of the target speed gear has started to be synchronized with the rotation of the main shaft of the automatic transmission. If the input/output rotational speed ratio ECL has not become smaller than the predetermined value ECLnmBK, the program is immediately terminated.

Figure 11:
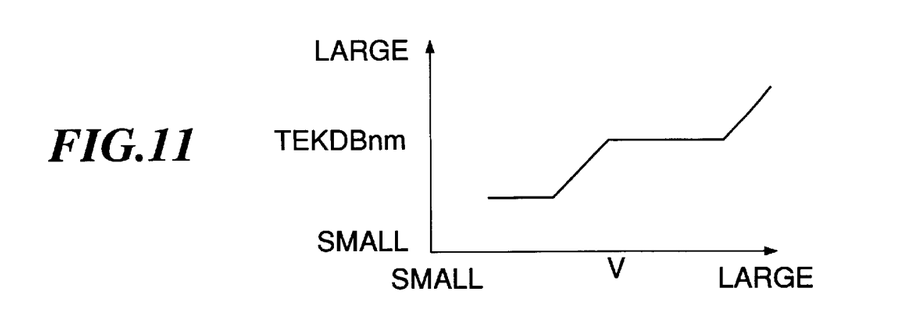
FIG. 11 shows a table for determining an additional torque increment TEKDBnm according to the vehicle speed V.

On the other hand, if the input/output rotational speed ratio ECL has become smaller than the predetermined value ECLnmBK, the flag FKDB is set to "1" at a step S20. Then, it is determined at a step S21 whether or not the value of the down-counting timer TKDnm is equal to 0. If the value of the down-counting timer TKDnm is not equal to 0, the torque correction amount DTESFT is set to the torque decrement TEKDD at a step S22. This setting is for decreasing the engine output torque after completion of the downshift to thereby reduce a shock, as indicated by a state 2 in ~FIG. 7D. Then, at a step S23, an additional torque increment TEKDBnm is calculated, followed by terminating the present routine. FIG. 11 shows a table for determining the additional torque increment TEKDBnm according to the vehicle speed V. The additional torque increment TEKDBnm is set to a larger value as the vehicle speed V becomes larger. There are provided six different patterns of this table depending on the gear-shifting conditions, similarly to the torque increment TEKDUnm.

If the value of the down-counting timer TKDnm is equal to "0" at the step S21, it is determined at a step S24 whether or not the torque correction amount DTESFT is equal to or larger than 0. If the torque correction amount DTESFT is not equal to or larger than 0, the additional torque increment TEKDBnm is added to the torque correction amount DTESFT at a step S25. This addition is for reducing a shock generated after completion of the downshift by progressively returning the torque correction amount DTESFT to 0, as indicated by a state 3 in FIG. 7D.

On the other hand, if the torque correction amount DTESFT is equal to or larger than 0 at the step S24, the torque correction amount DTESFT is set to 0 at a step S26, and the flags FKD and FKDB are reset to "0" at a step S27, followed by terminating the present routine.

According to the present embodiment, as described above, when a downshift is started upon stepping-on of the accelerator pedal, the torque correction amount DTESFT is set to the torque increment TEKDUnm to increase the output torque of the engine. As a result, a prompt increase in the engine rotational speed NE can be obtained and hence a drop in the output torque during the inertia phase can be suppressed. Further, when the downshift is completed, the torque correction amount DTESFT is set to the torque decrement TEKDD to decrease the output torque of the engine, and thereafter the additional torque increment TEKDBnm is added to the torque correction amount DTESFT, to thereby progressively return the torque correction amount DTESFT to 0. Thus, the driving force can be smoothly controlled to a value assumed just before the downshift, after completion of the downshift. As a result, a drop in the driving force and a sharp increase in the driving force after completion of the downshift, as indicated by the broken lines in FIGS. 7B and 7C, can be canceled, to thereby reduce a shock caused by the downshift.

Although in the above described embodiment the engine output torque is controlled by regulating the throttle valve opening, this is not limitative. Alternatively, the engine output torque may be controlled by regulating the retard amount of the ignition timing, to achieve substantially the same results.

What is claimed is:

1. A control system for an internal combustion engine for a vehicle having an accelerator pedal, said engine having an automatic transmission, the control system being operable during gear shifting of said automatic transmission, for changing output torque of said engine to reduce a shock generated during said gear shifting, comprising:

engine output torque-increasing means operable during gear shifting of said automatic transmission upon stepping-on of said accelerator pedal in which a change gear ratio of said automatic transmission is to be increased, for increasing said output torque of said engine by a first predetermined amount based on an operating condition of said vehicle when an increase occurs in rotational speed of said engine due to said gear shifting;

engine output torque-decreasing means operable after said output torque of said engine is increased by said first predetermined amount, for decreasing said output torque of said engine by a second predetermined amount based on said operating condition of said vehicle; and engine output torque-recovering means operable after said output torque of said engine is decreased by said second predetermined amount, for progressively recovering said output torque of said engine to a value assumed upon completion of said gear shifting.

2. A control system as claimed in claim 1, wherein said engine has an intake system, and a throttle valve arranged in said intake system, said control system including throttle valve control means for controlling valve opening of said throttle valve, and for changing said output torque of said engine by controlling said valve opening of said throttle valve via said throttle valve control means.

3. A control system as claimed in claim 1, wherein said control system changes said output torque of said engine by controlling ignition timing of said engine.

4. A control system as claimed in claim 1, wherein said first predetermined amount is set to a larger value as traveling speed of said vehicle is higher.

5. A control system as claimed in claim 1, wherein said automatic transmission has an input side and an output side, said engine output torque-increasing means terminates operation thereof when a ratio of rotational speed between said input side and said output side of said automatic transmission drops below a predetermined value.

6. A control system as claimed in claim 1, wherein said engine output torque-decreasing means has an operating time period thereof set to a larger value as traveling speed of said vehicle is higher.

7. A control system as claimed in claim 1, wherein said second predetermined amount is set to a larger value as traveling speed of said vehicle is higher.

8. A control system as claimed in claim 1, wherein said engine output torque-recovering means progressively recovers said output torque of said engine to said value assumed upon completion of said gear shifting by adding a third predetermined amount based on said operating condition of said vehicle to a value of said output torque of said engine decreased by said second predetermined amount.

9. A control system as claimed in claim 8, wherein said third predetermined amount is set to a larger value as traveling speed of said vehicle is higher.

* * * * *